3,106,515
PROCESS AND APPARATUS FOR CONCENTRATING NITRIC ACID

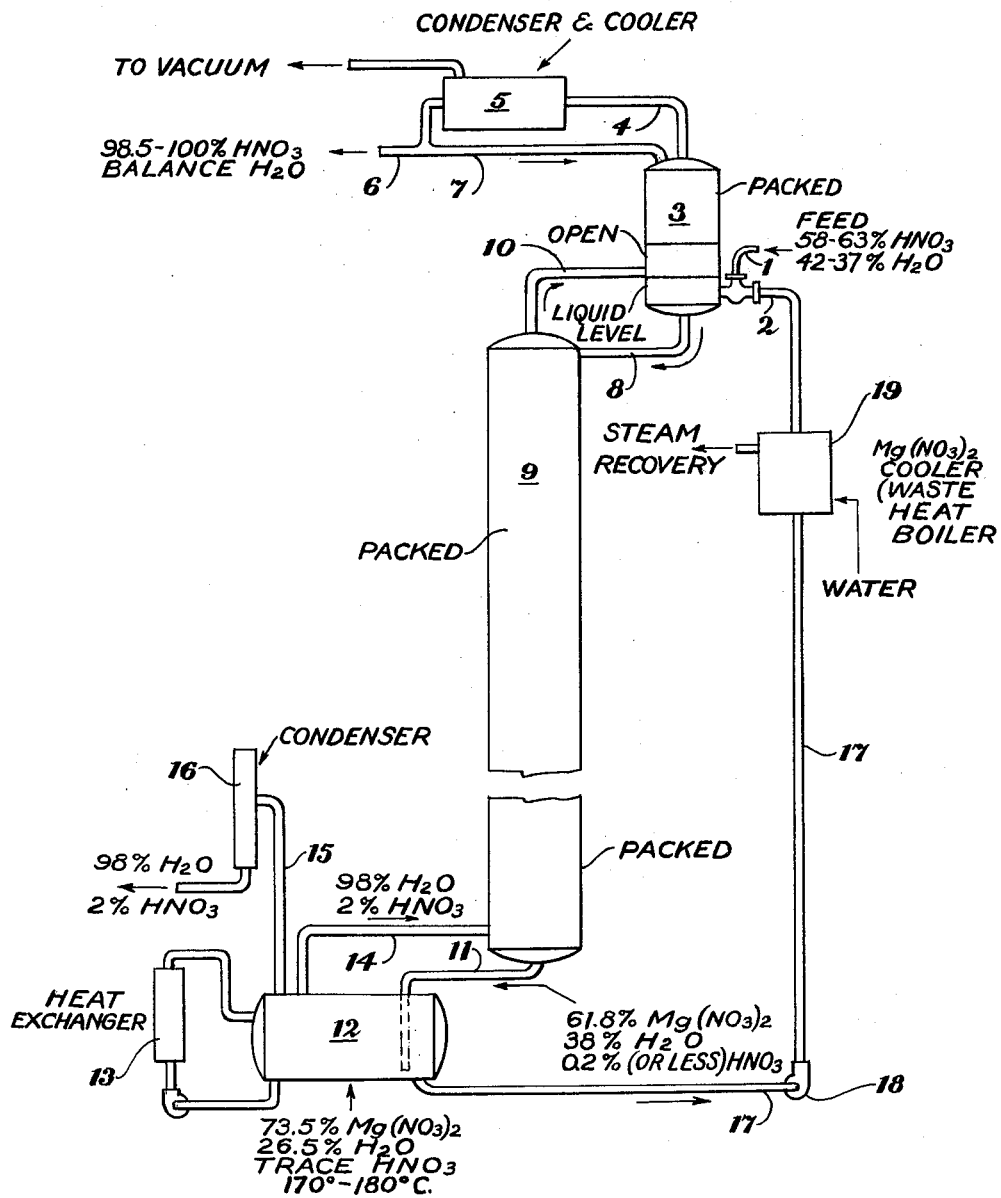

Robert A. Williams, Kingsport, Tenn., assignor to Eastman Kodak Company, Rochester, N.Y., a corporation of New Jersey
Filed Feb. 1, 1956, Ser. No. 562,729
6 Claims. (Cl. 202—53)

This invention relates to a method of concentrating nitric acid and apparatus therefor. More especially it relates to a method and apparatus for concentrating nitric acid in which an alakline earth metal nitrate is used as a dehydrating agent. Included in this invention is the use of a concentrated aqueous solution of alkaline earth metal nitrate having a temperature less than its boiling temperature as a dehydrating agent. Also included in this invention is the use of at least 8 theoretical distillation plates in the stripping portion of the nitric acid concentrating operation. This invention also includes introducing the acid feed and dehydrating agent into the system into a void portion of the rectifying portion of the apparatus employed from which it is passed to the stripping portion thereof.

Nitric acid cannot be separated from water by simple distillation because a constant boiling mixture of approximately 68% nitric acid concentration is ordinarily formed. Previously the standard method of concentrating aqueous nitric acid has been a distillation process using sulfuric acid as the dehydrating agent to withdraw the water, to permit boiling off of the nitric acid. In the procedures of this type, operations proposed for re-concentrating sulfuric acid diluted in the nitric acid concentrating operation have been costly and difficult.

More recently methods have been proposed for concentrating nitric acid in which magnesium nitrate has been used as the dehydrating agent; as described in U.S. Patent No. 2,463,453, Beardsley. This invention is an improvement over the Beardsley method in that the waste water obtained may be discarded economically, the combination of apparatus employed is relatively simple, the temperatures in the stripping column are moderate and the magnesium nitrate solutions which are transferred have a comparatively low nitric acid content.

One object of my invention is to provide a method of concentrating aqueous nitric acid, in which an alkaline earth metal nitrate is used as the dehydrating agent, having certain desirable features. Another object of my invention is to provide a method for concentrating nitric acid in which nitric acid of approximately 99.5% strength is obtained, without any auxiliary steps or devices being necessary over and above those contained in the unit in which the operation is carried out. A further object of my invention is to provide a method for concentrating nitric acid in which some of the heat employed in concentrating the dehydrating agent may be reclaimed and strong nitric acid may be obtained, with the use of less reflux acid than formerly. A still further object of my inventon is to provide a process for concentrating nitric acid in which the waste water contains such a low concentration of nitric acid that it may be economically discarded without any further processing being necessary. Other objects of my invention will appear herein.

My invention relates to a process of concentrating nitric acid in a distillation column in which an alkaline earth metal salt is employed as the dehydrating agent, which salt solution is first concentrated such as by boiling and the temperature of the resulting solution is decreased below its boiling point prior to its introduction into the system. It is also desirable in carrying out the concentration of nitric acid, in accordance with my invention, that the dehydrating agent be mixed with the nitric acid feed and introduced as a mixture into the stripping column. In preparing concentrated nitric acid in accordance with my invention the condensation of the nitric acid vapors is preferably carried out under vacuum conditions.

In concentrating nitric acid in accordance with my process the aqueous solution of the salt dehydrating agent is mixed with the aqueous nitric acid feed, desirably in amounts within the range of 5–8 parts of the former to 1 part of the latter. The ratio of reflux acid returned to the rectifying column, to the concentrated nitric acid withdrawn as product, is within the range of 1.0–3 parts of the former to 1 of the latter, preferably within the range of 1.5–3 to 1. The dehydrating agent solution is concentrated to 60–80%, or preferably 65–75%, prior to its mixing with the nitric acid feed and introducing into the stripping column. The aqueous nitric acid is usually acid of 50–68% nitric acid concentration, although some variation may be met with here.

In the operation of the procedure in accordance with my invention, the aqueous dehydrating agent and the weak nitric acid feed are fed into the bottom of the rectification column, either being mixed before introduction into the column or upon introduction therein. The dehydrating agent solution is supplied to the column at a temperature less than that at which it boils, such as approximately 135° C. to 145° C., temperatures within this range being particularly effective when the dehydrating salt has been concentrated to a concentration of at least 70%. To obtain a dehydrating agent solution of this concentration the used aqueous dehydrating agent in dilute form is boiled, such as at a temperature of 175–185° C. The aqueous dehydrating agent immediately prior of its introduction into the system is reduced in temperature which reduction may be accompanied by the generation of low pressure steam in a waste heat boiler, whereby heat is recovered. The use of the dehydrating salt solution having a lowered temperature within the range of approximately 135° C. to 145° C., permits the production of strong nitric acid with the use of less reflux acid, thereby giving a greater unit capacity or a decreased cooling water rate to the nitric acid condenser.

For the concentration of nitric acid, in accordance with my invention, the stripping column employed should have an aggregate length of at least 8 theoretical plates which contributes to the substantial absence of nitric acid in the spent hydrous salt solution withdrawn from the base of the stripping column. Theoretical distillation plates are well known in the art and are used to measure the distillation capability of a given column in distillation procedures. A discussion of this concept may be found in chemical engineering texts, such for instance as in "Elements of Chemical Engineering," by Badger and McCabe (1936); pages 340–365 inclusive, or in "The Chemical Engineers Handbook," 3rd edition, edited by John H. Perry, both of which are published by the McGraw-Hill Book Company.

By operating the stripping column so that the nitric acid is substantially all stripped from the acid feed supplied to the column, the magnesium nitrate salt solution withdrawn from the bottom of the column is so low in nitric acid that this solution can be piped and pumped at high temperatures without severe corrosion problems. Furthermore, water can be evaporated from this solution to reactivate it for reuse without any further recovery of nitric acid therefrom, since the small concentration of nitric acid remaining in the water may be economically discarded. Although magnesium nitrate is preferred as the dehydrating agent for use in my process, other alkaline earth metal nitrates such as of calcium, strontium or barium are useful for that purpose.

The attached drawing illustrates a combination of apparatus adapted for concentrating nitric acid in accordance with my invention. The process of concentrating nitric acid may be better explained by referring to this drawing. Weak nitric acid is introduced into the system through conduit 1 and is mixed with a solution of magnesium nitrate from line 2, such as in a mixing T as shown, or each may be introduced separately into the bottom of the vertical rectification column 3 and mixed. This column consists of an upper part packed with suitable packing material, such as Raschig rings or the like, and a lower void portion. Alternately, the upper part of column 3 may contain bubble cap plates. It is preferred that any portions of the apparatus including the packing material which contact with the nitric acid be of Duriron. In the bottom part of the rectification column 3 a level of liquid is maintained therein sufficient to continuously pass that liquid through pipe 8 into vertical stripping column 9. The nonpacked part of the rectification column 3 acts as a flash chamber or equalizing section and in this open space considerable nitric acid is vaporized, which vapors pass through the rectification section of the column. In addition, this lower unpacked section minimizes any tendency towards "bumping" when cold nitric acid feed and hot magnesium nitrate solution are mixed therein. The vapors, which pass through rectification column 3, are led by means of line 4 into a condenser 5 which is preferably but not necessarily maintained under reduced pressure. A vacuum on the order of 20 inches of water has been found to be suitable for this purpose. When a vacuum is employed on the condenser, it also causes a vacuum of approximately 20 inches of water in the rectifying column. The condenser may be at atmospheric pressure. A part of the condensate formed in condenser 5 is withdrawn from the system through exit 6 and the remainder is returned through line 7 to the rectification column, as reflux, in the selected reflux ratio by conventional means.

The mixture of nitric acid feed and dehydrating agent, provided in the bottom part of column 3, passes through line 8 into a vertical stripping column 9 where the mixture moves down the column and is progressively stripped of its nitric acid content in the operation of the column. Sometimes it is desirable to divide column 9 into two or more columns of suitable aggregate length. Column 9 is packed with any suitable packing material, which may be for instance Duriron Raschig rings, Berl saddles or the like. If desired, column 9 may be a conventional bubble cap plate column of suitable material, such as Duriron, or it may contain other suitable means for contacting liquid and vapors such as slotted plates. The acid vapors formed in column 9 are transmitted through line 10 to the open section of the rectification column 3. At the bottom of column 9 the dehydrating salt solution is in dilute form, having taken up water from the nitric acid feed and from the steam introduced into the column.

This dilute salt solution is withdrawn from the column through line 11 into a base heater 12 where it is heated by circulation through a heat exchanger 13, which heat exchanger is heated with high pressure steam in a conventional manner. Sufficient thermal energy is thereby supplied to the contents of base heater 12 to boil out from the spent dehydrating salt solution a sufficient quantity of water to result in a salt concentration therein of 60–80%. The solution in the base heater and the water vapor boiled off therefrom have a concentration of nitric acid of no more than 2% and in the case of the water vapor preferably considerably less than 2%. Part of the steam produced by boiling the spent dehydrating salt solution is introduced into the stripping column through line 14 and the remainder is passed through line 15 and condenser 16, the water therein condensed being discarded. The proportion of the steam introduced into the column is selected to assure an amount thereof to supply the desired heat to the stripping column. The thus concentrated dehydrating salt solution is withdrawn from base heater 12 through line 17 by means of pump 18. Line 17 may be equipped with a jacket or an internal steam pipe if there is any thickening of the salt solution in that line.

Near the point of introduction of the hot magnesium nitrate solution to the concentrating system, that solution is reduced in temperature, such as to 130–150° C., by passing through a cooling means 19. This cooling means may be a conventional heat exchanger as shown. Any means which will cool the magnesium nitrate solution to the desired degree may be used such as a chamber with cooling fins, a vacuum evaporator, surrounding the element containing the solution with a coil (or introducing it interiorly) in which coil a liquid is circulated which will extract heat. Any conventional means which will accomplish the desired cooling with good advantage may be used. Steam may be recovered from this operation or the heat extracted from the magnesium nitrate solution may be discarded. Care should be used that under the cooling conditions used the magnesium nitrate retains its flowability.

The following example illustrates my invention:

A solution of magnesium nitrate in water of 73.5% concentration, containing traces of nitric acid, at 140° C. was mixed with a stream of 60% strength nitric acid in a mixing T. The mixture was passed into the bottom of a 24 in. diameter Duriron rectifying column. The top half of the column was packed with 1" x 1" Duriron Raschig rings and the bottom was unpacked. The ratio of the magnesium nitrate solution to the 60% nitric acid was approximately 5:1. There was withdrawn from the top of this column nitric acid vapor of at least 98.5% concentration. This vapor was condensed and cooled in a condenser which was under vacuum; part of the condensate thus obtained was withdrawn as concentrated nitric acid and the remainder was returned to the column as reflux using a reflux ratio of approximately 2:1.

The mixture of dehydrating agent and aqueous nitric acid was passed continuously from the bottom of the rectifying column to a vertical 40 ft. length stripping column having an aggregate length greater than 8 theoretical plates. For ease in construction, the lower 20 ft. of this column was constructed as a separate tower. Nitric acid vapors formed and were passed to the rectifying column into the void section above the liquid and directly under the packed section thereof. From the bottom of the stripping column aqueous magnesium nitrate of 61.8% concentration was withdrawn to a base heater. The magnesium nitrate solution in the base heater was concentrated by boiling to a concentration of 73.5% magnesium nitrate at a temperature of about 173° C. The heat was supplied by a heat exchange system using high pressure steam. The boiling resulted in steam which contained approximately 2% of nitric acid and 98% of water. Part of this steam was returned to the stripping column as needed to supply the heat to facilitate the stripping of nitric acid vapors from the aqueous acid fed thereto. The remainder of the water vapor, formed by boiling the dehydrating salt solution in the base heater, was led to a condenser where it was condensed and discarded as water.

The magnesium nitrate solution as it was concentrated was continuously withdrawn from the base heater, passed through a heat exchanger to lower its temperature from 175° to 140° C. near the point of its introduction into the bottom of the rectifying tower and then fed back into the system as specified above.

By operation of the described nitric acid concentration system under optimum conditions, nitric acid of a 99.5–100% concentration may be obtained.

This application is a continuation-in-part of my application Serial No. 457,003, filed September 20, 1954, now abandoned.

I claim:

1. A combination of apparatus for the concentration of nitric acid which comprises a vertical stripping column having an aggregate length equivalent to at least 8 theoretically perfect distillation plates, substantially above the stripping column, a vertical rectifying column the upper portion only of which is packed and an enclosed boiling vessel substantially below the stripping column, the top of the stripping column being connected to the rectifying column both by an inlet thereto from the bottom of the latter and an outlet therefrom entering the latter column near the top of the nonpacked portion, the bottom of the stripping column being connected to the boiling vessel by an outlet therefrom to the latter and an inlet thereto from the top of said boiling vessel, the top of the rectifying column being connected by an outlet to a condenser and an inlet from the condensate portion of the condenser, the boiling vessel having a source of heat to promote boiling of its contents, a second outlet from its top to conduct vapors therefrom and a passage from the bottom of the boiling vessel to a mixing T which in addition contains an inlet for the introduction of aqueous nitric acid feed, said mixing T opening into the lower nonpacked portion of the rectifying column.

2. A combination of apparatus for the concentration of nitric acid which comprises a vertical stripping column having an aggregate length equivalent to at least 8 theoretically perfect distillation plates, substantially above the stripping column, a vertical rectifying column the upper portion only of which is packed, and an enclosed boiling vessel substantially below the stripping column, the top of the stripping column being connected to the rectifying column both by an inlet thereto from the bottom of the latter and an outlet therefrom entering the latter column near the top of the nonpacked portion, the bottom of the stripping column being connected to the boiling vessel by an outlet therefrom to the latter and an inlet thereto from the top of said boiling vessel, the top of the rectifying column being connected by an outlet to a condenser and an inlet from the condensate portion of the condenser, the boiling vessel having a source of heat to promote boiling of its contents, a second outlet from the top of the boiling vessel adapted to conduct vapors therefrom and a passage from the bottom of the boiling vessel, through a cooling means, to a mixing T which in addition contains an inlet for the introduction of aqueous nitric acid feed, said T opening into the lower nonpacked portion of the rectifying column.

3. A continuous process for concentrating aqueous nitric acid in a combination of apparatus which includes a rectifying column and a stripping column which comprises mixing dilute aqueous nitric acid with a concentrated aqueous solution of an alkaline earth metal nitrate having a temperature of 135–145° C., immediately introducing the mixture into the nonpacked lower portion of the rectifying column, wherein flashing off of nitric acid vapor is effected immediately under the packed upper portion thereof, passing the mixture from the bottom of the rectifying column into the top of the stripping column having an aggregate length equivalent to 8 theoretically perfect distillation plates wherein nitric acid vapors are formed and passed therefrom to the rectifying column at a point immediately beneath the packed portion thereof in which those vapors are rectified and from which they are passed to a condenser to liquefy the same, passing the diluted aqueous alkaline earth metal nitrate solution which collects in the bottom of the stripping column to a boiling vessel where water is boiled therefrom, returning a portion of the water vapor thus formed as steam to the lower portion of the stripping column and discarding the remainder, the concentrated aqueous alkaline earth metal nitrate solution thus formed being mixed with further aqueous nitric acid feed and returned to the distillation system immediately after passing through a cooling means to adjust its temperature to 135–145° C.

4. A continuous process for concentrating aqueous nitric acid in a combination of apparatus which includes a rectifying column and a stripping column which comprises mixing dilute aqueous nitric acid feed with a concentrated aqueous solution of magnesium nitrate, immediately introducing the mixture into the nonpacked lower portion of the rectifying column, and effecting flashing off of nitric acid vapors therefrom immediately under the packed upper portion thereof, passing the mixture from the bottom of the rectifying column into the top of the stripping column, said column having an aggregate length equivalent to 8 theoretically perfect distillation plates, wherein nitric acid vapors are formed and are passed therefrom to the rectifying column at a point immediately beneath the packed portion thereof in which those vapors are rectified and from which they are passed to a condenser to liquefy the same, passing the diluted aqueous magnesium nitrate salt solution which collects in the bottom of the stripping column to a boiling vessel where water is boiled therefrom, returning a portion of the water vapor thus formed to the lower portion of the stripping column and discarding the remainder, the thus concentrated aqueous magnesium nitrate salt solution being mixed with further nitric acid feed and introduced into the nonpacked lower portion of the rectifying column.

5. A continuous process for concentrating aqueous nitric acid in a combination of apparatus including a rectifying column and a stripping column which comprises mixing aqueous nitric acid feed and a concentrated aqueous solution of magnesium nitrate and immediately introducing into the bottom of the rectifying column, only the bottom portion of which is nonpacked, to effect flashing off of nitric acid from the mixture directly beneath the packed portion of the column, passing the nitric acid-magnesium nitrate mixture to the top of the stripping column which column has an aggregate length equivalent to 8 theoretically perfect distillation plates in which nitric acid vapors form and pass from the top of the column into the rectifying column directly beneath the packing wherein those vapors are rectified and are passed to a condenser to form concentrated nitric acid, the dilute aqueous solution of magnesium nitrate which collects in the bottom of the stripping column being passed to a boiling vessel wherein water is boiled therefrom so as to concentrate the solution to 60–80%, part of the water vapor being returned as steam to the lower portion of the stripping column, the remainder being discarded, the concentrated aqueous magnesium nitrate obtained being introduced into the nonpacked lower portion of the rectifying column immediately after mixing with further aqueous nitric acid feed.

6. In a process of concentrating nitric acid with magnesium nitrate in a combination of apparatus containing a stripping column and a rectifying column the lower portion only of the latter being nonpacked, the step which comprises introducing, directly after their admixture, aqueous nitric acid feed and magnesium nitrate dehydrating agent into the nonpacked lower portion of the rectifying column whereby nitric acid vapor is flashed off beneath the packed portion of the rectifying column, from which rectifying column the remaining liquid mixture of feed and magnesium nitrate dehydrating agent is passed to the top of the stripping column.

References Cited in the file of this patent

UNITED STATES PATENTS

| | | |
|---|---|---|
| 1,395,577 | Jensen | Nov. 1, 1921 |
| 2,054,096 | Potts et al. | Sept. 15, 1936 |
| 2,463,453 | Beardsley | Mar. 1, 1949 |
| 2,593,931 | Stearns | Apr. 22, 1952 |
| 2,658,863 | Guala | Nov. 10, 1953 |
| 2,716,631 | Bechtel | Aug. 30, 1955 |
| 2,722,506 | Ellis | Nov. 1, 1955 |

OTHER REFERENCES

Robinson and Gilliland: Elements of Fractional Distillation, Fourth Edition, McGraw-Hill, 1950, pp. 125–127 and 397 relied on.